May 1, 1945.  H. PELPHREY  2,374,890
GEAR CUTTER
Filed Oct. 29, 1940
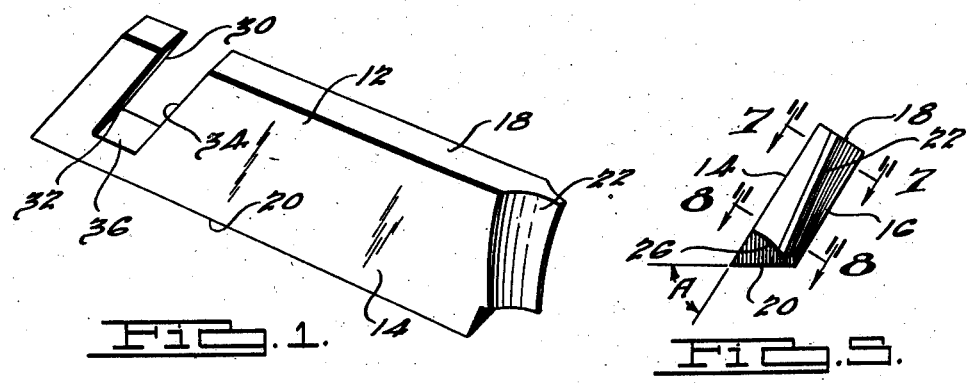
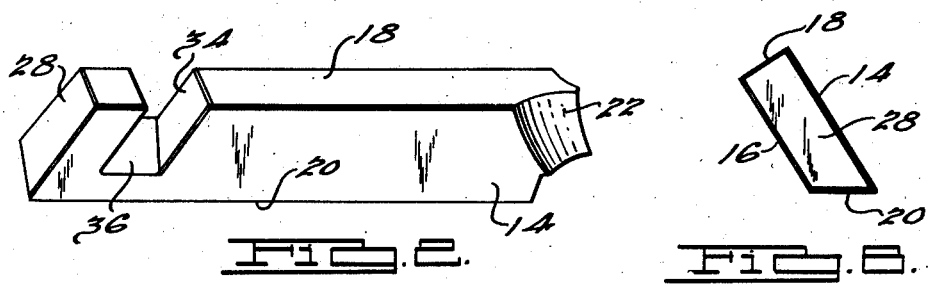
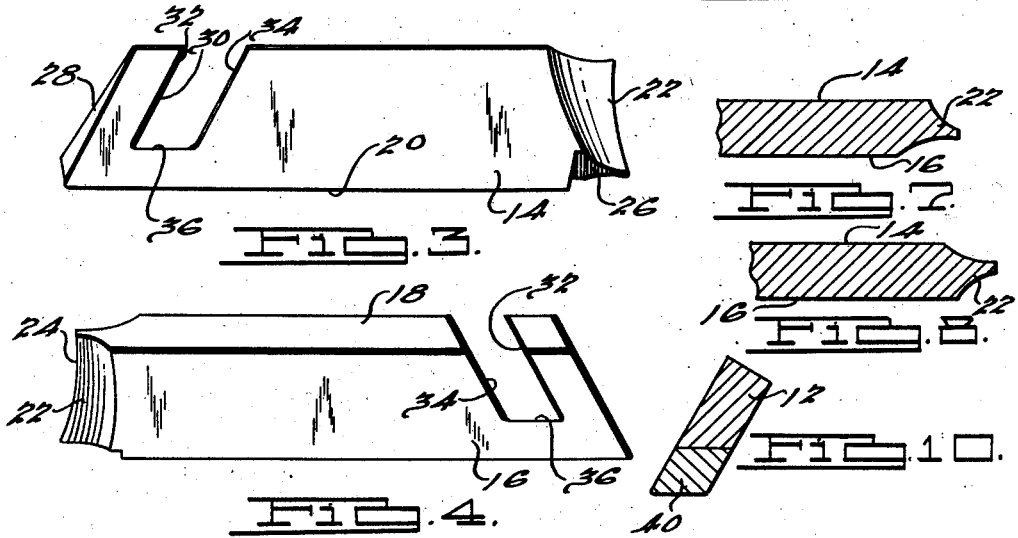
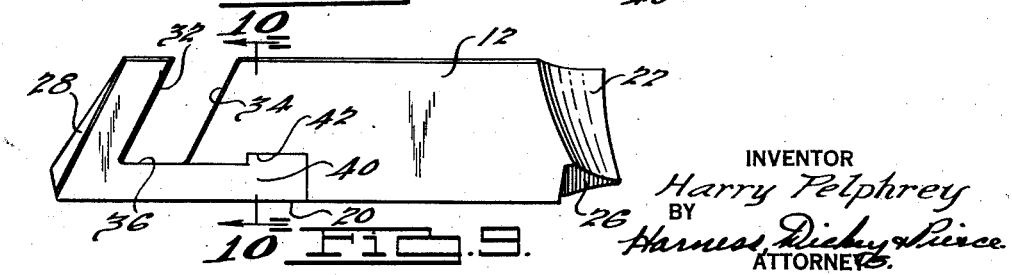
INVENTOR
Harry Pelphrey
BY
Harness, Dickey & Pierce
ATTORNEYS.

Patented May 1, 1945

2,374,890

UNITED STATES PATENT OFFICE 2,374,890

GEAR CUTTER

Harry Pelphrey, Detroit, Mich., assignor to Michigan Tool Company, Detroit, Mich., a corporation of Delaware Application October 29, 1940, Serial No. 363,329

7 Claims. (Cl. 29—95)

The present invention relates to gear cutters and particularly relates to the type of gear cutter which is adapted for use in the type of gear forming machine disclosed and claimed in the copending application of Harry Pelphrey, Serial No. 363,331, filed October 29, 1940, now Patent No. 2,346,867, April 18, 1944.

One of the primary objects of the present invention is to provide improved gear cutters of the type mentioned in the use of which all of the teeth of an external gear may be simultaneously formed, so that the entire interdental space between adjacent teeth of the gear to be cut is removed by a single cutter.

Another object of the invention is to provide an improved gear cutter of the type mentioned by which helical gear teeth may be cut in an expeditious and improved manner.

A further object of the invention is to provide an improved cutter of the type mentioned, which may be radially fed with respect to the gear blank in an improved manner.

A further object of the invention is to provide an improved gear cutter which may be easily sharpened and has a comparatively long life.

Other objects of the invention will become apparent from the following specification, the drawing relating thereto, and from the claims hereinafter set forth.

In the drawing, in which like numerals are used to designate like parts throughout:

Figure 1 is a perspective view of the improved gear cutter according to the present invention;

Fig. 2 is a top elevational view of the cutter illustrated in Fig. 1;

Fig. 3 is a right side elevational view of the gear cutter shown in Fig. 2;

Fig. 4 is a left side elevational view of the gear cutter shown in Fig. 2;

Fig. 5 is a front elevational view of the gear cutter shown in Fig. 2;

Fig. 6 is a rear elevational view of the gear cutter shown in Fig. 2;

Fig. 7 is a cross-sectional view taken substantially along the line 7—7 of Fig. 5;

Fig. 8 is a cross-sectional view taken substantially along the line 8—8 of Fig. 5;

Fig. 9 is a view similar to Fig. 3 illustrating a modified form of a gear cutter; and, Fig. 10 is a cross-sectional view taken substantially along the line 10—10 of Fig. 9.

The gear cutter of the present invention may be formed by the method disclosed in the copending application of Harry Pelphrey, Serial No. 363,332, filed October 29, 1940, now Patent No. 2,346,865, April 18, 1944.

The gear cutter, which is preferably formed of high speed steel, includes a main body portion 12, which in transverse section is in the form of a right angle trapezoid defined by sides 14 and 16, a top edge 18 and a bottom edge 20. It will be seen that the sides 14 and 16 are parallel to each other and that the edge 18 is at right angles to the sides 14 and 16. The edge 20 is not parallel to side 18 and forms an acute angle with side 14. Such angle is indicated at A in Fig. 5 and is preferably the outside helix angle of the gear to be cut.

The outside helix angle is preferred so that the cutters may be made as thin as possible. According to the broader aspects of the present invention such angle could be the helix angle on the pitch or the base circles, but in such cases the cutters would necessarily have to be thicker.

The cutting portion is formed along one end edge of the cutter as indicated at 22. The surfaces of such cutting portion are involute in form and the form has a cross-sectional configuration conforming to the shape of the entire interdental space between the teeth of the gear to be cut. The surfaces of the cutting portion 22 also follow the helix of the gear to be cut, with the end edge 24 tapering towards side 18 to provide end clearance. The cutting edge on the cutting end 22 is indicated at 26 and is in the form of a flat, which is ground normal to the helix. Such flat is at a predetermined angle with respect to the edge 24 and such angle provides the angle of rake for the cutter.

In order to provide for shifting the cutters radially with respect to the stock, as disclosed and claimed in the first mentioned copending application of Harry Pelphrey, the opposite end edge of the cutter, as indicated at 28, also tapers inwardly toward edge 18; and the surface of such end edge conforms to the surface of a cooperating cone member, as disclosed in the just mentioned copending application. A slot 30 is formed adjacent such end edge and is generally parallel to such end edge. Such slot is formed by oppositely disposed sides 32 and 34, which are flat and parallel to each other. The bottom 36 of the slot is spaced from edge 20 and is substantially parallel thereto. A cooperating cone member, as disclosed in the first mentioned copending application, engages side 32 to shift the cutter radially in one direction.

When the cutter becomes dulled in use the flat 26 may be ground back on the rake angle and normal to the helix, so that the cutter retains its proper shape conforming to the shape of the entire interdental space between the teeth to be cut.

In Figs. 9 and 10 an improved form of the present invention is illustrated, in which the cutter is formed in separable sections. Corresponding numerals are used to designate corresponding parts; and it will be seen that the line of separation is along the base surface 36 with an integral forwardly projecting portion 40 formed to interlock with a complementary recess 42 formed in the main portion 12 of the cutter. The projection 40, together with the under edge of the main portion forms the continuous edge 20 of the cutter. The two separate portions are thus interlocked when in position within the cutter head, disclosed in the first mentioned copending application of Harry Pelphrey, so that the cutters may be readily moved radially with respect to the gear blank. It will thus be seen that the forward or cutting portion of the cutter may be replaced and that the tail portion of the cutter may be used with other cutter forms.

Formal changes may be made in the specific embodiment of the invention described without departing from the spirit and substance of the invention, the scope of which is commensurate with the appended claims.

What is claimed is:

1. A cutter for use in cutting helical teeth in machine elements comprising an elongated member, said member in transverse section being a right angle trapezoid in form, an elongated cutting portion formed along one end edge thereof, said cutting portion having a cross-sectional configuration conforming to the shape of the entire interdental space between the teeth to be cut, said one end edge tapering inwardly toward one of the sides of said member to provide cutting clearance, the opposite end edge also tapering inwardly toward said one of the sides, and a slot in said member through said one of the sides substantially parallel to said opposite end edge.

2. A cutter for use in cutting helical teeth in machine elements comprising an elongated member, said member in transverse section being a right angle trapezoid in form, an elongated cutting portion formed along one end edge thereof, said cutting portion having a cross-sectional configuration conforming to the shape of the entire interdental space between the teeth to be cut, said one end edge tapering inwardly toward one of the sides of said member to provide cutting clearance, the opposite end edge also tapering inwardly toward said one of the sides, and a slot in said member through said one of the sides substantially parallel to said opposite end edge, the surface of said opposite end edge conforming to the surface of a cone.

3. A cutter for use in cutting helical teeth in machine elements comprising an elongated member, said member in transverse section being a right angle trapezoid in form, that side of said trapezoid which is not at right angles to its adjacent sides forming an acute angle with one of its adjacent sides, said acute angle being the outside helix angle of the teeth of the machine element being formed, means forming a cutting portion along one end edge thereof, said cutting portion having a cross-sectional configuration conforming to the shape of the entire interdental space between the teeth to be cut.

4. A cutter for use in cutting helical teeth in machine elements comprising an elongated member, means forming a elongated cutting portion along one end edge thereof, said elongated cutting portion having a cross-sectional configuration conforming to the shape of the entire interdental space between the teeth to be cut, and separable means attached to said member, said separable means including an interlocking portion which engages with a complementary interlocking portion on said member along one side thereof, and another portion spaced from and adjacent said opposite end edge thereof and extending substantially parallel thereto.

5. A cutter for use in cutting helical teeth in machine elements comprising an elongated member, an elongated cutting portion formed along one end edge thereof, said cutting portion having a cross-sectional configuration conforming to the shape of the entire interdental space between the teeth to be cut, said one end edge tapering inwardly toward one of the sides of said member to provide cutting clearance, the opposite end edge of said member also tapering inwardly toward said one of said sides, and a separable member attached to said first named member, said separable member including an interlocking portion which interlocks with a complementary portion of said member, and an end portion which tapers in the same direction as said opposite end edge, said last named portion being spaced from said opposite end edge to provide a slot between said first and second named members.

6. A cutter for use in cutting helical teeth in machine elements comprising an elongated member, said member in transverse section being a right angle trapezoid in form, an elongated cutting portion formed along one end edge thereof, said cutting portion having a cross-sectional configuration conforming to the shape of the entire interdental space between the teeth to be cut, said one end edge tapering inwardly toward one of the sides of said member to provide cutting clearance, the opposite end edge of said member also tapering inwardly toward said one of said sides, and a separable member attached to said first named member, said separable member including an interlocking portion which interlocks with a complementary portion of said member, and an end portion which tapers in the same direction as said opposite end edge, said last named portion being spaced from said opposite end edge to provide a slot between said first and second named members.

7. A cutter for use in cutting the form of external involute helical teeth in machine elements comprising an elongated member, said member in transverse section being a right angle trapezoid in form with the distance between the parallel sides thereof substantially less than the distance between the non-parallel sides, means forming an elongated helical cutting portion along one end edge thereof, said cutting portion extending between said opposite sides of the trapezoid, said elongated cutting portion having the form of cross-sectional configuration of an internal involute tooth conforming to the shape of the entire interdental space between the teeth to be cut, the leading end of the cutting portion being formed with a transverse flat normal to the helix, said leading end facing toward the one of said non-parallel sides of the trapezoid which forms the acute angle with its adjacent side.

HARRY PELPHREY.